Feb. 5, 1952 W. A. FONKEN ET AL 2,584,567
FISH PROCESSING APPARATUS
Filed April 16, 1945 7 Sheets—Sheet 3

INVENTORS
William A. Fonken
BY Edmund Auer
Arnold and Mathis
ATTORNEYS

Feb. 5, 1952  W. A. FONKEN ET AL  2,584,567
FISH PROCESSING APPARATUS
Filed April 16, 1945  7 Sheets-Sheet 4

INVENTORS
William A. Fonken
BY Edmund Auer
Arnold and Mathis
ATTORNEYS

Feb. 5, 1952 W. A. FONKEN ET AL 2,584,567
FISH PROCESSING APPARATUS
Filed April 16, 1945 7 Sheets-Sheet 5
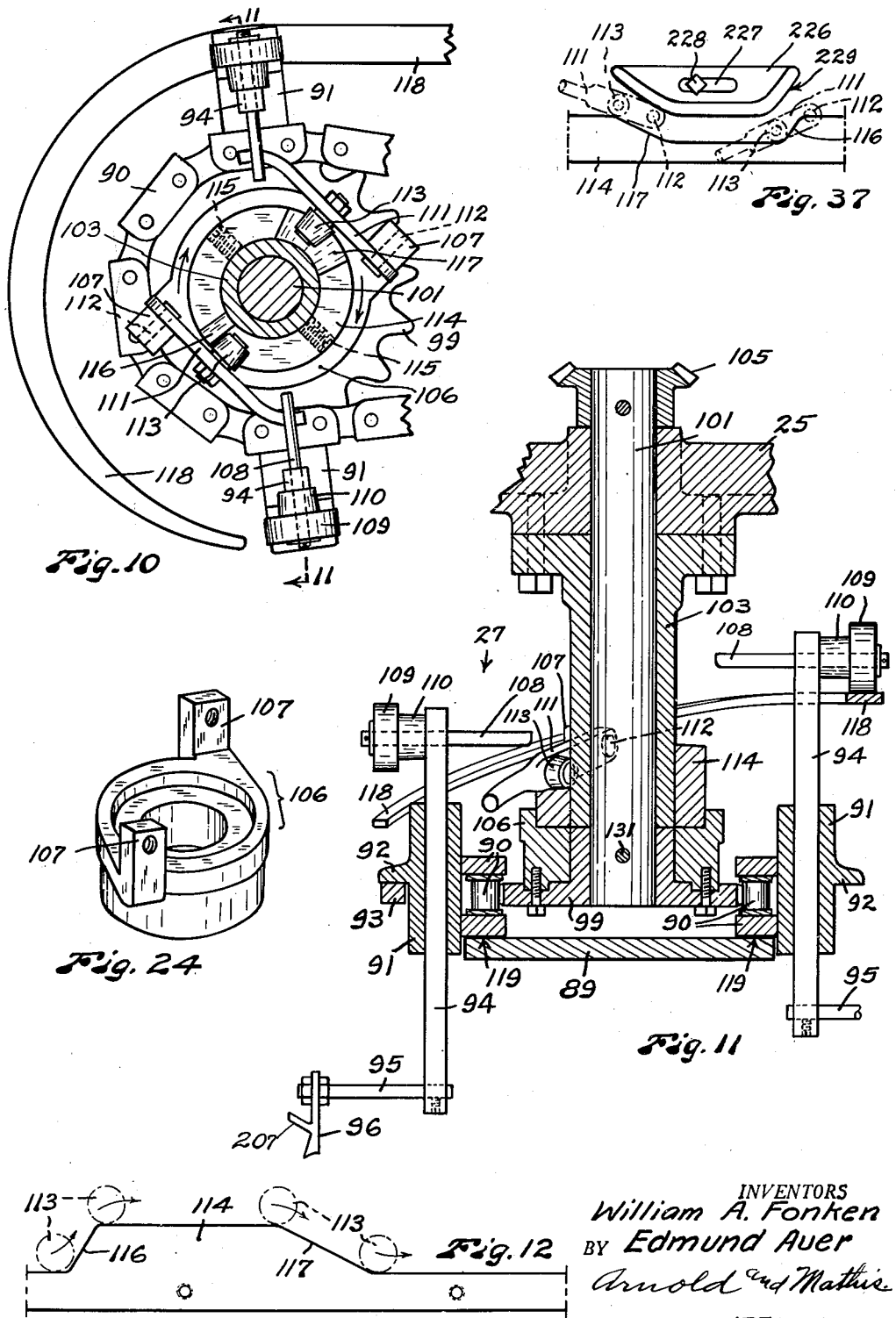
INVENTORS
William A. Fonken
BY Edmund Auer
Arnold and Mathis
ATTORNEYS

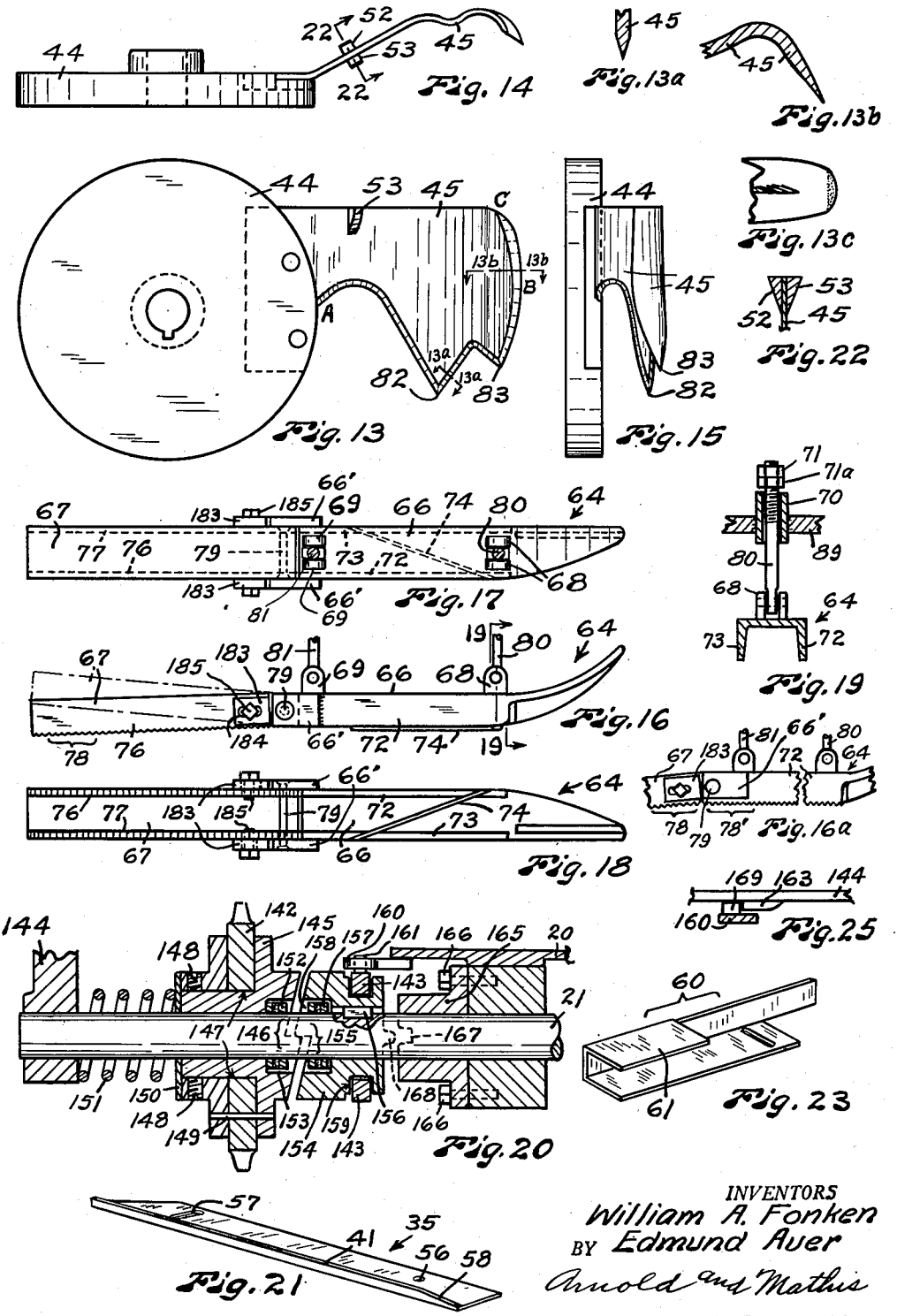

Feb. 5, 1952 W. A. FONKEN ET AL 2,584,567
FISH PROCESSING APPARATUS
Filed April 16, 1945 7 Sheets-Sheet 7
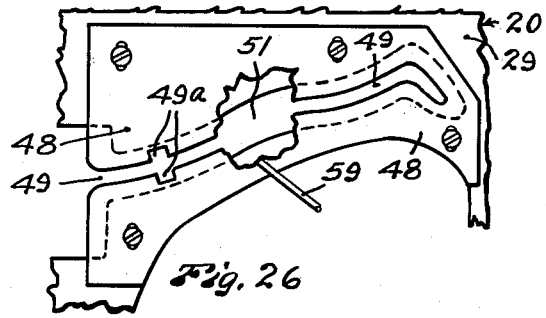
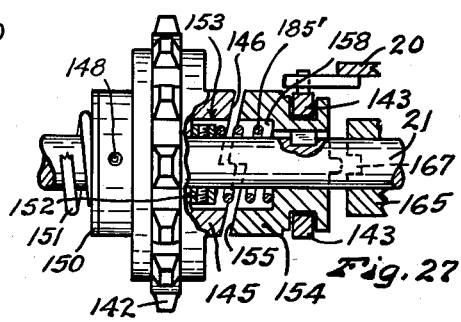
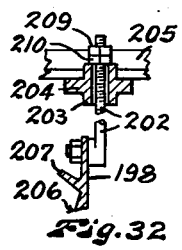
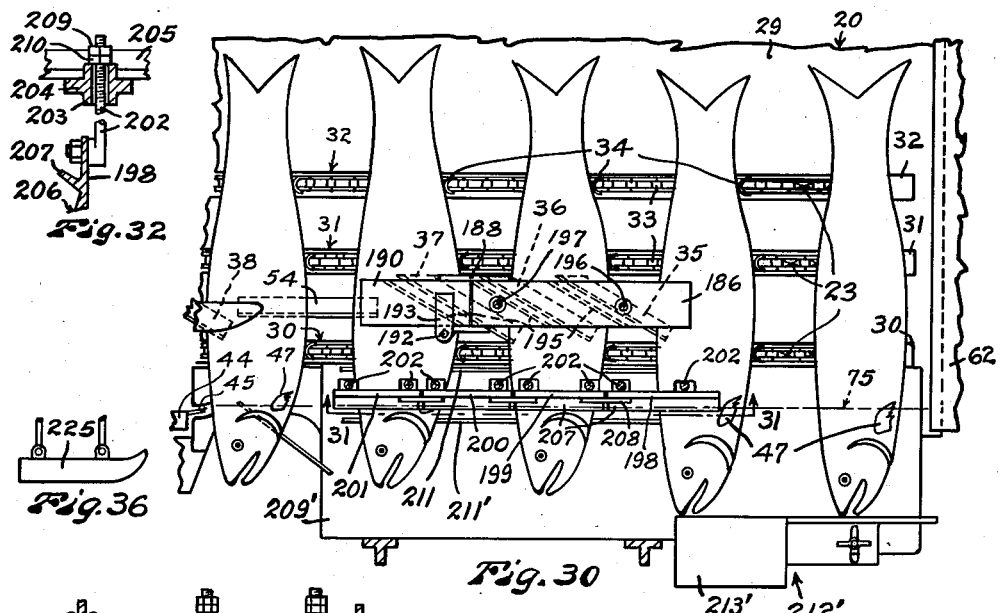
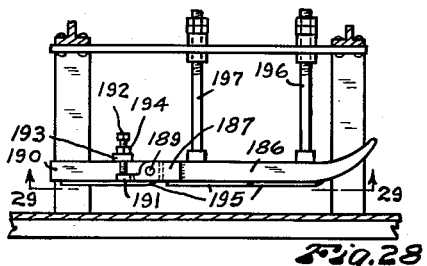
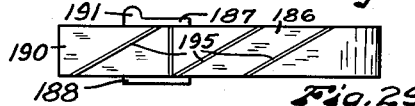
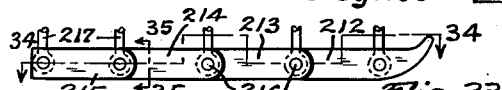
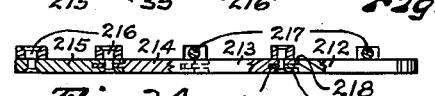
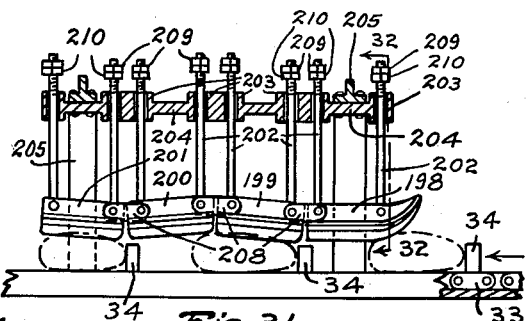
INVENTORS
William A. Fonken
BY Edmund Auer
Arnold and Mathis
ATTORNEYS Patented Feb. 5, 1952

2,584,567

UNITED STATES PATENT OFFICE 2,584,567

FISH PROCESSING APPARATUS

William A. Fonken and Edmund Auer, Seattle, Wash., assignors to Smith Cannery Machines Company, Seattle, Wash., a corporation of Washington Application April 16, 1945, Serial No. 588,522

14 Claims. (Cl. 17—4)

Our invention relates to improvements in the art of processing fish and apparatus therefor. More particularly our invention relates to improvements in the art of aligning and beheading fish of varying sizes and a machine therefor.

Still more particularly our invention relates to a method of aligning fish characterized by its safety to operators and high rate of production, and relates to a method of aligning fish of varying size and degrees of firmness in rapid succession relative to the line of cutting of a beheading knife while the fish are being subjected to counteracting forces to obtain positive precise control in aligning to avoid to the utmost wastage of edible meat, and wastage due to errors in feeding, and to an apparatus for carrying out the same at relatively high speed, and at a relatively high rate of production. Especially and particularly is our invention related to providing for exact aligning and beheading fish where the variation in sizes of the fish heads is very great. In this connection, our purpose is to provide fish pulling means which renders it possible for an operator to employ a nose stop or guide as an aid in initially positioning the fish even though the variation in the lengths of the heads is very great, and thus eliminate all necessity of eye judging on the part of the operator as to where to initially position the fish in starting it over the table.

Furthermore, we provide a clutch mechanism which stops the conveyor mechanism only at predetermined positions and an improved beheading knife which compresses the meat out of the head part of the fish just before severing the head and thereby conserve choice edible portions of meat. Also, we provide for preventing the severed head from interfering with the next advancing fish and cause a force to be imparted to the severed head and/or body which causes these members to move in opposite directions at the moment of severing. Still further, we provide an improved clip to engage the cleithrum, and modified forms of our invention which provide for simplified construction and also in other features as the rotary knife mounted upon a shaft at right angles to the longitudinal axis of the table which, among other advantages, simplifies the manufacture of the table. These and other features are provided by our invention, the same being a brief and therefore incomplete summary.

In canning fish, particularly salmon, it is important to conserve all of the edible meat that is possible and this requires that when the fish is beheaded that the cut be made uniformly on fish after fish varying in size and conditions as close as possible to the cleithrum bone on the rear side of the gill opening. On the one hand it is necessary to avoid including any gill part with the edible meat and on the other hand it is important to avoid any wastage of the edible meat in the attempt to eliminate all gill parts. Our invention relates to improvement in the automatic mechanical aligning of fish to avoid such wastage so that the alignment is accomplished with positive precision and uniformity upon fish even when the table becomes extremely slimy and the fish vary greatly in size and whether the fish are of a "hard" or "soft" condition. This varying in "condition" must be taken into consideration in providing the results of our invention.

Furthermore, our invention avoids the positive necessity heretofore existing of having the "header" man (the man who heretofore manually placed the fish beneath the knife) being of special skill and years of experience to avoid wastage of edible meat. Not only did such "header" man have to possess great skill but he had to be of a definite nervous temperament or make-up to be trained to do the job and stand the strain particularly due to the danger to his hands and fingers during long hours of a heavy salmon run. Such operators are now practically non-existent due to the war and their elimination by reason of age. At such times realizing that he is tired, such operator keeps the beheading cut a safe distance from his hand and back of the proper line of cut so that the wastage of fish by manual feeding to the knife becomes very great. Thus, our invention contributes to the war effort, as respects the manpower shortage, by not requiring such skilled and such special temperamental operators. Our invention does not require any skill in feeding to the knife as this is done mechanically and automatically by the machine with precision and the operator who places the fish initially on the table is not required to do any judging. He has only to place the noses of the fish against the previously set nose guide.

When it is undertaken to mechanically move fish of varying sizes and varying in condition of softness and hardness with uniform precision into alignment with the line of cutting of a beheading knife and do this at a relatively high rate of speed, particularly after the equipment becomes wet and heavily coated with fish slime by continuous operation for protracted periods, it is found that a particularly difficult problem arises. The fish when lying on its side presents a convex surface to the table, and in fact its form is completely well streamlined. The force necessary to move it rapidly in high speed production operates to develop a momentum which makes it difficult to bring the fish to a stop and renders the fish very difficult to mechanically control in bringing the line of cut just rearward of the cleithrum in precise position with the beheading knife, for beheading purposes. The very force necessary to move it rapidly operates to put the fish out of control. Forces applied to the fish of large size are not ordinarily adapted to small fish and forces adapted to properly operate with fish of hard condition do not function properly when a fish of relatively soft condition is encountered and as a result the fish is not aligned with that degree of uniform accuracy and precision which is so important if wastage of edible meat is to be avoided. Since nearly one hundred millions of fish each season are processed, a small amount of wastage on each fish amounts in the aggregate to a great total loss—a result to be definitely avoided if humanly possible when the world is in such a desperate food situation. Our purpose is to prevent wastage and conserve one of our great natural food resources—the saving amounting to millions of pounds per season as compared to manual alignment, and this without the great danger to the fingers and hands of operators ever present in manual alignment.

We have discovered a method of controlling with precision the fish while being advanced over the table while lying on their sides transversely of the table and preferably back first. To this end we have discovered how to apply a force to the fish tending to withdraw the fish from the alignment line while being so advanced. Nevertheless, the application of this force is such as to permit a second force to move a clip engaging means over the fish in the opposite direction in skin depressing manner until it engages the cleithrum. Thus, the fish is being moved in an opposite direction to that of the clip prior to the engagement of the clip with the cleithrum so that the period of time of contacting the cleithrum is reduced. After the cleithrum is engaged by the clip then the force actuating the clip is of such greater magnitude that the fish is moved towards the alignment line even though a pulling force is still operating on the fish thus tending to pull the fish in the opposite direction and thereby subjecting it to positive control. However, the forces are such and so applied as not to damage the fish. As the clip moves the cleithrum of the fish toward registration with the alignment line, the pulling force is reduced and is entirely removed just before the cleithrum reaches registration with such line. The application of these forces are thus characterized by permitting such sliding or releasable contact in providing for precision control during alignment and permitting the initial starting of the fish, large and small, over the table by positioning their noses against a guide. In short, all the fish for a particular set up may start with their noses aligned on a predetermined line.

The task of supplying to and positioning fish upon the feed table when operating at high speeds is one requiring great agility and quickness on the part of the operator in synchronizing his operations with the appearance of the lugs carried by the conveyor chains. The operator's position is alongside the front end portion of the table. Hence, his eyes normally first catch sight of the chain lugs on his side of the table coming from their return run beneath the table to start their run over the top of the table. This means that the lugs should be as nearly in a transverse line across the table as possible. To have the lugs on the chain on the opposite side considerably ahead of those of the chains next to the operator often results in a fish being positioned tardily so that the tail portion misses the lug on the far side of the table. Accordingly, we have discovered that it is desirable to have the axis of the shaft on which the beheading knife operates to extend at right angles to the longitudinal axis of the table, thus making it possible to have the fish conveyed over the table top while their longitudinal axes are disposed at substantially ninety degrees to the longitudinal axis of the table. This in turn renders it possible for the operator to take his cue in initially shoving the fish upon the feed table from the lugs on the conveyor chain nearest him.

Furthermore, the blow to the body of the fish incident to the beheading operation causes some individual fish to jump out of position and become entangled with the mechanism requiring a shutting down of operations until the same is cleaned out. The effect of this blow of the knife is minimized by the shape and form of the cutting edges of the knife, as well as providing for an endwise thrust by a projection carried by the blade of the knife. Also, such blow in beheading often causes the head to jump out of position and get in the way of advancing fish so that it becomes important that at the same time the cut is made in beheading there should be an outwardly directed force applied to the head to push it away from the knife in a predetermined direction.

When the fish are of relatively large size they are so close together that the severed head does not have time to clear the next fish when dependence is on gravity alone to have it fall out of the way. Our aim is to prevent the severed head interfering with the succeeding head and we achieve this (a) by having the axis of the shaft of the beheading knife at right angles to the advancing fish so the blow severing the head does not tend to force it into the path of the advancing fish but directly outwardly and away from such path, (b) preferably, by also providing projections on the knife blade that imparts an added backward blow to the severed head to forcibly make it clear the path of the next advancing fish and thus insure no interference with the next fish, and (c) by having even the small support for the head supplied by a rod reduced (by having the rod disposed at a slant) if not removed altogether at the moment of severing.

In providing for precision of positioning of the fish with respect to the line of alignment with the beheading knife and maintaining the fish in such position, most careful attention, we have discovered, must be given to maintaining a neat balance of forces applied to the fish. This requires means to prevent the head from hanging back and thereby changing the position of the longitudinal axis of the fish with respect to the longitudinal axis of the conveyor means. To this end we provide rods over which the heads may transversely and longitudinally slide so that the relatively heavy heads are prevented from developing objectionable friction. Also we provide anti-friction rods for the body of the fish so that the fish is rendered more subject to control by means specially provided by our invention. Thus, one of the fundamental objects of our objects of our invention is to either provide oppositely directed or oppositely directed and counteracting forces so that fish of varying size and condition can be precisely controlled. We have discovered that the weight of the fish cannot be primarily relied upon to maintain its position on the table. The effectiveness of this weight varying with the different sizes of fish and with the amount of accumulated slime is not enough. Our invention provides for a nicety of balance of forces that permit a precision of control of a fish in its movement into the line or plane of alignment established by the plane of cutting of the beheading knife blade. Summarily stated, we accomplish this by applying to the fish forces operating in a direction away from the line of alignment, and another greater force operating in a direction to move the fish to the plane of cutting or alignment against such oppositely directed forces, and we provide for holding forces and for reducing the "pulling away" forces as the fish approaches the line of alignment.

Our purpose is to provide an apparatus to carry out the same characterized by combining in cooperation, features which all function together in achieving our primary results, namely, protection to the operators, precision in causing the line of cutting and severing the head to be done with the least wastage of edible meat upon fish after fish in rapid succession, avoidance of fish becoming askew of the table and to maintain such precision while operating at a high rate of speed and production upon fish varying greatly in length of head.

In providing our invention to achieve the results set forth above, we have discovered that it is important to combine primary features of our invention in cooperative action, as follows:

*Firstly.—Right angled rotary knife shaft.*—In providing a rotary fish beheading knife for a fish dressing table it is important that the fish after being beheaded do not interfere in the course of their travel with the knife on its upstroke. If, to avoid such interference by the fish with the upstroke of the knife, the shaft on which the rotary knife is mounted is disposed at an angle to the longitudinal axis of the table so that the knife on its upswing is out of the path of the advancing fish, then objection arises due to the fact that the knife in the act of severing the head tends to move the head into the path of the oncoming fish and may thus cause the fish to become disaligned. We, in our invention, mount the rotary knife on a shaft with its axis at right angles to the longitudinal axis of the table and upon and/or after severing move the fish backward from the line of cutting to have the fish out of the way on the upstroke of the knife. Another advantage in having the shaft of the rotary knife with its axis at right angles to the longitudinal axis of the table, as provided in our invention, is that it facilitates the task of the operator at the front end of the table in synchronizing the feeding of the fish with respect to the lugs on the conveyor chains. When the shaft is disposed at an angle then the fish likewise are preferably disposed at an angle and that means that the tail end of the fish is in advance of the head. Since it is easier for the operator to note the appearance of the lugs on the near side of the table he is inclined to delay feeding the fish to the conveying chains until he sees the lugs on the near side, thus it happens that the fish may be fed late and the tail portion disposed rearward of the lug on the far chain instead of in front of said lug. By disposing the axis of the shaft on which the rotary knife is mounted at right angles to the axis of the table we thus facilitate the feeding of the fish as the fish may be disposed at substantially right angles to the longitudinal axis of the table and at the same time the blow of the knife operates to move the head outwardly and away from the next succeeding advancing fish rather than directly against the advancing fish. Thus, misaligning of the succeeding advancing fish is avoided. Finally having the shaft on which the rotary knife is mounted disposed at right angles to the longitudinal axis of the table greatly simplifies the manufacture of the table, and eliminates the danger of errors ever present when parts are to be correlated at an angle.

*Secondly.—Positive and precise control by counteracting forces.*—We have discovered how to positively control the fish of varying sizes and degrees of firmness in aligning them with "caliper like" precision with the plane or line of cutting. This control is achieved by subjecting the fish during their alignment to oppositely directed or counteracting forces. Specially designed movable fish-cleithrum-engaging clips are provided having one-half of their fish contacting face rounded and one-half sharp edges. Also having the fish disposed substantially at right angles to the longitudinal axis of the table (rendered readily possible by having the rotary knife shaft at right angles to the longitudinal axis of the table) prevents the said clips from running off the fish while moving into cleithrum engaging contact. Also there are provided special plate "pullers" which are fixedly and adjustably mounted on the table for engaging the bottom side wall of the fish as it lies on the table and also floatingly mounted pullers for engaging the upper body side wall of the fish while lying on its side.

These pullers have such contact with the fish that they pull the fish away from the line of alignment (located on same side of table as the knife) even while the actuated clip is initially contacting and moving lengthwise of the fish. During this initial contacting of the clips it will be understood that such contacting by the clips does not move the fish transversely of the table in the direction of the knife side of the table. However, as soon as the sharp edge portion of the actuated clip engages the cleithrum then the actuated force of such clip functions to overcome the force of the pullers so that the fish is moved controllingly and steadily to the line of alignment under the action of the two oppositely opposed forces. Of course the actuated force overcomes the force of the unactuated "pullers." When the fish is being finally moved into precise alignment, the pulling back force of the pullers in a direction away from the side of the knife is gradually reduced and finally removed altogether so that the fish is located positively on the line of alignment.

*Thirdly.—Projections on knife blade.*—We preferably provide a projection on the knife to impart an outwardly directed force to the head in severing to make it move outwardly from the knife. Also, preferably, a second projection on the opposite side of the knife is provided to make the body of the fish move back from the knife and so start it toward a position in which it will clear the knife in its upward swing due to further cooperating means. These cooperate in eliminating clogging the machine and delays which reduce production.

*Fourthly.—Means pulling beheaded fish away from plane of rotating knife.*—After the fish is beheaded, our invention provides for forces and means to move the beheaded fish away from the plane of rotation of the rotating knife so that said fish in no wise interferes with the knife upon its upswing.

*Fifthly.—Special clutch.*—We provide a special clutch mechanism for use on occasions when it is necessary to stop the flow of fish to the fish dressing machines in order that the fish conveyors always automatically stop with their lugs in a predetermined position to locate a fish which it may be advancing, directly and wholly beneath the knife and to have the knife continue rotating so that always upon stopping the advance of the fish there will not be a fish with its head only halfway beneath the knife. This provides against loss of time in operation and risk of injury by the knife since upon resuming operation there is no half severed head or mangled body to remove from beneath the knife in addition to correcting whatever caused the stoppage in the dressing machine. Production is increased as empty fish compartments on the conveyor chains are reduced. Above all, however, our special clutch avoids wastage of fish. If in stopping the conveyor chains, a fish is disposed part way beneath the knife, the knife may cut with its forward edge portion and this would cut through choice edible meat considerably back of the proper line of cutting with consequent wastage of said meat. Our new clutch mechanism prevents this and permits the lugs only to stop with the fish squarely beneath the knife so that the knife severs the head on the line for which it is specially shaped. Incidentally, let it be noted that the parallel guide opposite the slot at the head severing position also assists in preventing the fish from being drawn under the knife when the latter continues to rotate past the head severing position (when the conveyor chains are stopped).

All the above special features, together with others hereinafter described, are cooperatively combined to produce protection to the operators (as the machine is automatic in its various operations and operators may remain away from the knife), faster operation, and less wastage of fish. One example of such "other" feature is the combination of a rod only for supporting the head and parallel guide for fish during the head severing, thus providing for the head disposal and its non-interfering with the next advancing fish.

The above mentioned general objects of our invention, together with others inherent in the same, are attained by the mechanism illustrated in the following drawings, the same being preferred exemplary forms of embodiment of our invention, throughout which drawings like reference numerals indicate like parts:

Fig. 9 is a view of said clip contacting the cleithrum of a fish;

Fig. 10 is a view substantially on dotted line 10—10 of Fig. 4 showing index driving sprocket and associated cam member and chain;

Fig. 11 is a view substantially on dotted line 11—11 of Fig. 10;

Fig. 12 is a profile view of the cam projection;

Fig. 13 is a view in elevation of the beheading knife and mounting member;

Fig. 13a is a view in cross section on dotted line 13a—13a of Fig. 13;

Fig. 13b is a view in cross section on dotted line 13b—13b of Fig. 13;

Fig. 13c is a top view (looking down on back) of the end portion of a fish after severance of the head by our invention;

Fig. 14 is a top view of said beheading knife;

Fig. 15 is an end view of said knife;

Fig. 16 is a view in side elevation of a floatingly mounted hingedly connected two-member hold-down and puller means;

Fig. 16a is a fragmentary view in side elevation of a modified form of our invention of a floatingly mounted hingedly connected two-member hold-down means;

Fig. 17 is a top view of said hold-down and puller means showing a fish guiding bar in dotted line;

Fig. 18 is a view of the bottom side of said hold-down member;

Fig. 19 is a view in cross section on dotted line 19—19 of Fig. 16;

Fig. 20 is a longitudinal view in cross section of the clutch of our invention and associated parts;

Fig. 21 is a view in perspective of a fish pulling bar;

Fig. 22 is a view on dotted line 22—22 of Fig. 14;

Fig. 23 is a view in perspective of an adjustable nose guide member with hand rest located at the feed end of the table;

Fig. 24 is a view of the arm lift member in perspective;

Fig. 25 is a view in cross section of the lever or clutch handle and locking block;

Fig. 26 is the top view of the table plate showing the contour of the knife slot;

Fig. 27 is a view partly in elevation and partly in section of a modified form of a portion of the clutch mechanism;

Fig. 28 is a view in elevation of a modified form of the hold-down and puller means;

Fig. 29 is a view of the bottom of said modified form of said hold-down and puller means;

Fig. 30 is a plan view of a modified form of our invention;

Fig. 31 is a fragmentary view in elevation on line 31—31 of Fig. 30;

Fig. 32 is a view on line 32—32 of Fig. 31;

Fig. 33 is a view in elevation of a modified form of an alignment member of our invention;

Fig. 34 is a view on broken line 34—34 of Fig. 33;

Fig. 35 is a view in section on dotted line 35—35 of Fig. 33;

Fig. 36 is a view in elevation of still another modified form of an alignment member of our invention; and Fig. 37 is a view in elevation of a modified form of the cam of our invention.

Figure 1:
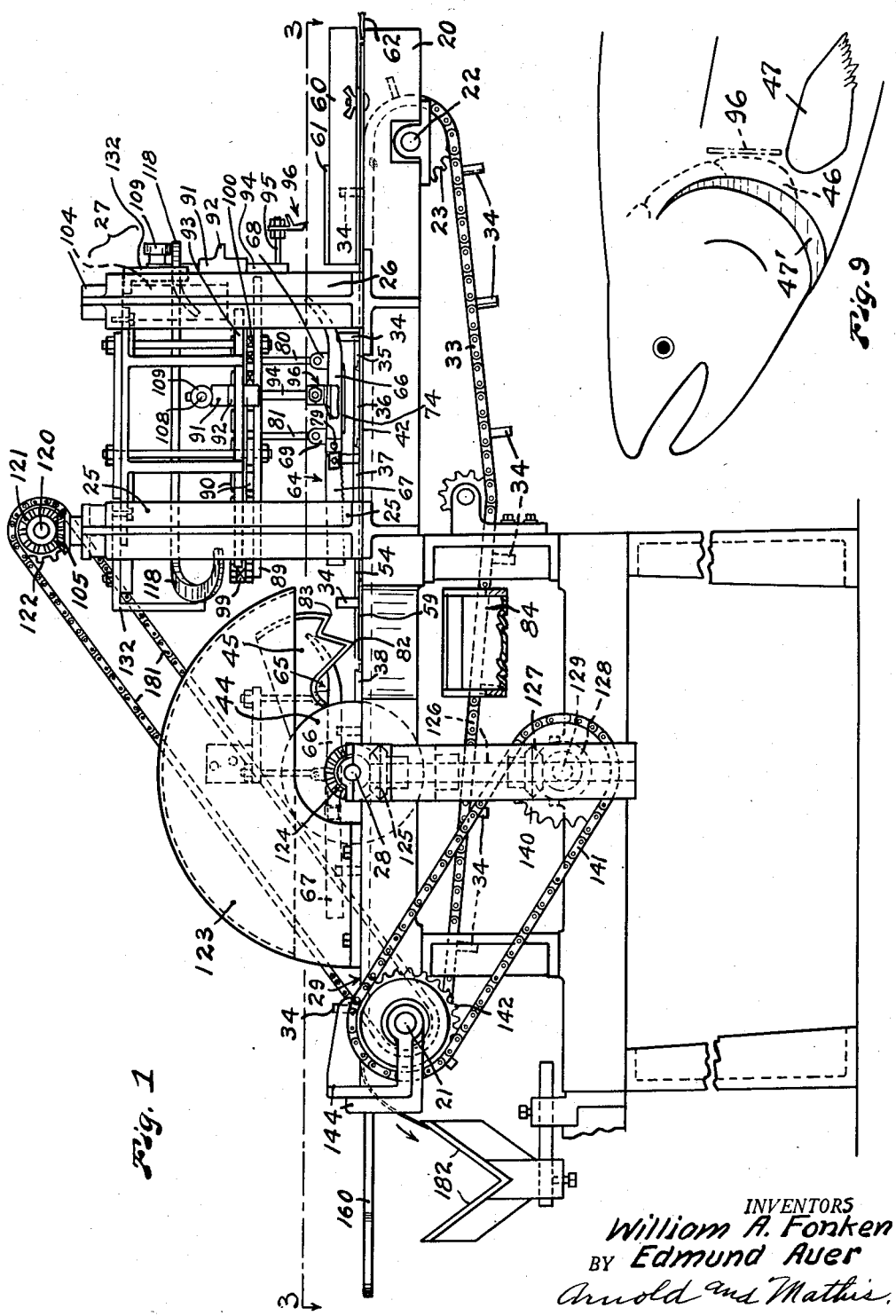
Figure 1 is a side view in elevation of fish feeding table embodying our invention.

A fish feeding table frame 20 has conveyor sprocket shafts 21 and 22 for mounting sprockets 23 at the front end of the table and sprockets 24 at the rear end of the table. U-shape brackets 25 and 26 mount traveling fish-aligning means referred to in general as 27. Mounted on said table also is fish beheading knife mounting shaft 28.

Figure 2:
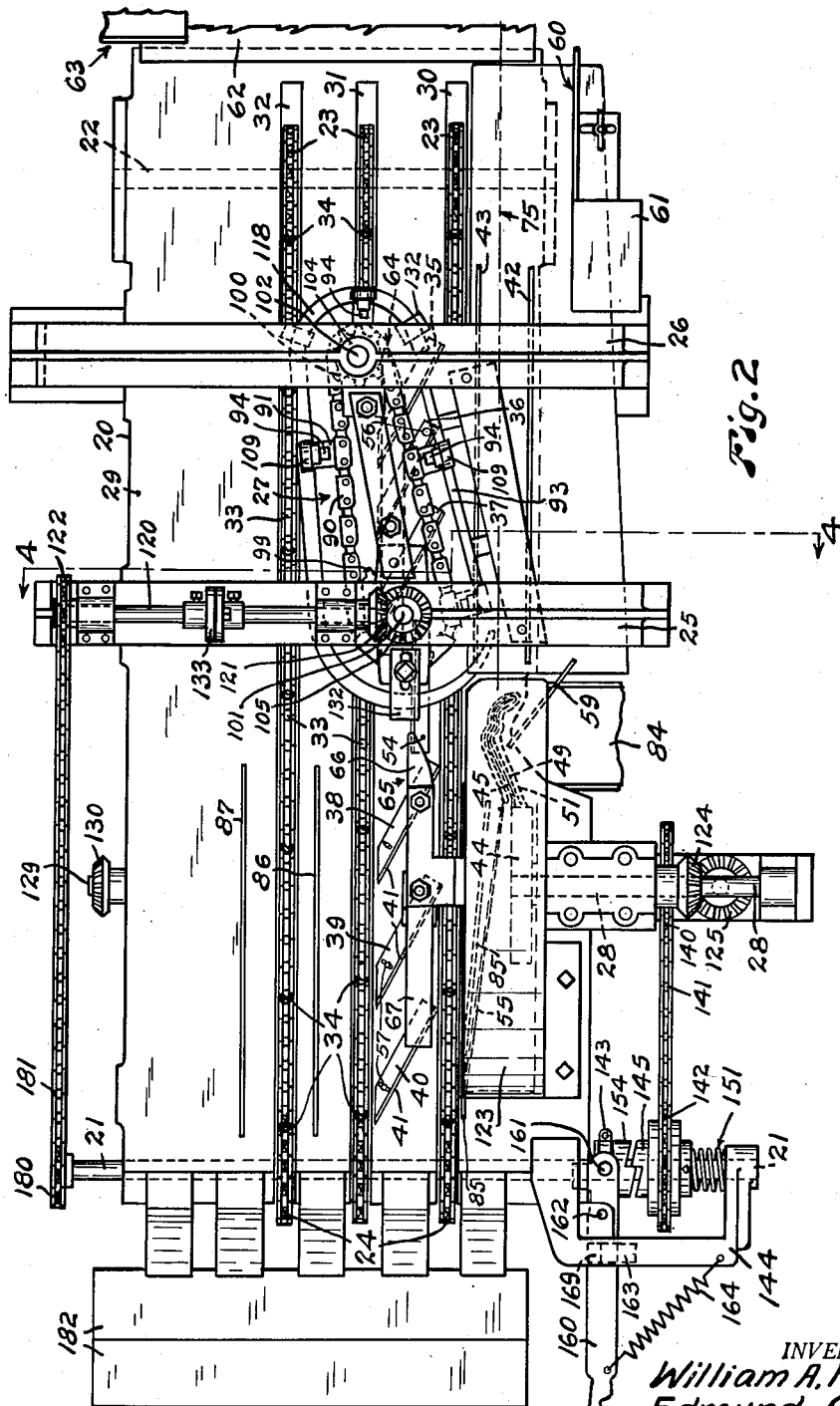
Fig. 2 is a plan view of the same.

The top 29, Fig. 2, of said table is provided with grooves 30, 31 and 32 in which conveyor chains 33 move being mounted on said sprockets 23 and 24. Said chains have upstanding lugs or fish engaging means or pushers 34 for engaging fish and these may extend substantially in line transversely of the table, the lugs on the middle chain, groove 31, being slightly out of line rearwardly in order to provide for the convex character of the ventral side of the fish, while the tail lug on chain 33 in groove 32 may be slightly ahead of the lug on chain in groove 30 to compensate for smallness of tail as compared to head. Be it noted that there is no advance of such lug in groove 32 due to any angular disposition of the shaft which mounts the knife. Also, a distinct advantage in eliminating the angular position of the knife shaft is the resulting simplification in construction. When the heavy cast table top is set up for machining, it is not necessary to reset it to machine the parts disposed at an angle. These lugs 34 engage the fish as they are positioned upon the table by an operator standing at the side near the front. The lugs 34 pressing in the softer parts of the fish push the fish while lying on their sides lengthwise of the table preferably with their backs first and their heads extending to the left of groove 30. Stationary diagonal fish engaging pullers 35, 36, 37, 38, 39, and 40 may be mounted between grooves 30 and 31 by bolts in opening 56 and adjusting slot 57 (Figs. 2 and 21). Each of these diagonal pullers has a relatively sharp upstanding rib 41 (see Fig. 21) in order the better to grip the fish. However, the leading edge of each rib is tapered at 58 to allow the fish initially to ride easily upon the puller. Rod 59 partly supports the head at the instant the second point 82 of the knife 45 first contacts the fish, the front point 83 is higher and contacts the fish later so that the cutting operation proceeds forward and aft of the second point 82. At the moment of severing, the head is about free of support from rod 59 and is free upon severing to fall into chute 84. Head supporting or slide rods 42 and 43 serve to lessen the friction of the head on the table and thereby facilitate the alignment of the fish rendering its movement transversely of the table more entirely subject to the action of all the aligning means—a lagging head may facilitate the conveyor chains causing a fish to asume an acute angle to the longitudinal axis of the table, thereby displacing a fish from its proper positioning and preventing its true alignment. The head of a fish is relatively heavy compared to the rest of the fish. With a large fish the head may extend from the lugs 34 on chain in groove 30 as much as eleven inches.

Figure 3:
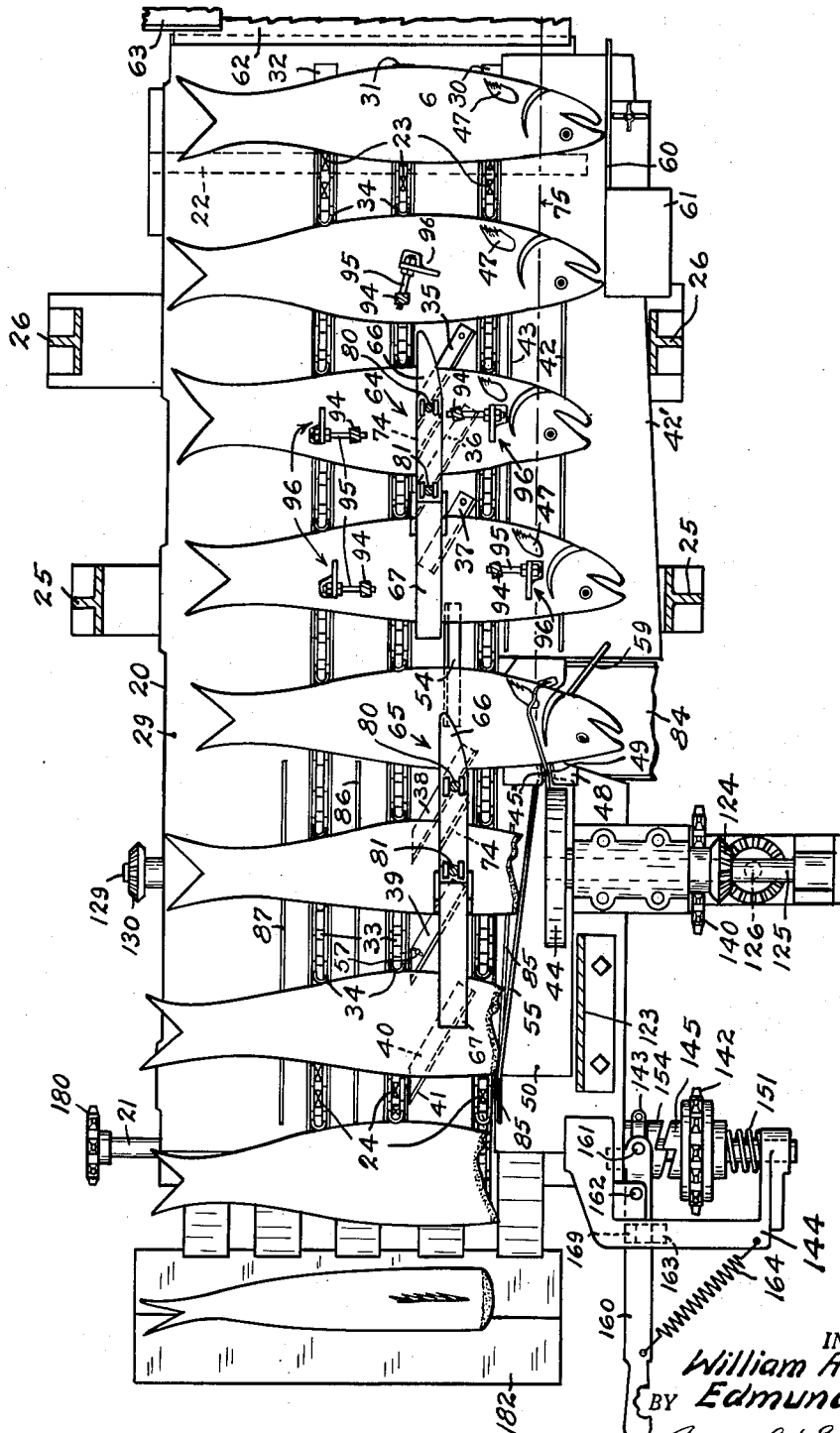
Fig. 3 is a plan view with parts broken away of the same illustrating the various positions of fish being aligned.

The axis of knife mounting shaft 28, Fig. 3, extends transversely of the table at ninety degrees to the longitudinal axis of the table. On this shaft is mounted the fish beheading knife mounting member 44, Fig. 13, upon which is mounted the fish beheading knife 45. The contour of this knife cross sectionally considered, Fig. 26, is such as to register with the line of cut across the fish just rearward of the cleithrum 46, Fig. 9, and the joint or joining part of the pectoral fin 47 thereby removing in one operation not only the head but the fin joint portion, thereby cutting through the fin and causing it to drop away. The cut then preferably angles forwardly. The table plate 48, Fig. 26, is provided with a fish beheading knife slot 49 to permit the knife to continue revolving through the table and return on its upward stroke in the fish beheading knife rear opening 50 disposed opposite the fish beheading knife slot 49 (Fig. 3). Recesses 49a permit projections 52 and 53 of the knife blade to pass. The wide slot 51, shown in dotted line, is cast in the table top 29. Applying the plate 48 makes possible a precise close fitting shearing slot readily adjustable to the knife contour.

The cutting edge of the knife from A to B is preferably filed on two sides to form a relatively blunt double beveled edge as shown in Fig. 13a while the edge B to C is filed on one side only with a long tapering bevel as shown in Fig. 13b to form a sharp cutting edge. The mode of operation of this knife with the fish not pressingly held down by floatingly weighted hold-down means and in fact upheld except as it is held to a small degree against transverse movement by parallel guide 54 is this: The relatively blunt edge of the knife functions to compress the head during severing. As the meat cannot escape on the head side as it is composed largely of bone, it is readily and freely pressed backward on the body side as the fish is not held down. Thus, is insured and saved a rounded bulge of meat extending to the head side of the cut as shown in Fig. 13c.

The fish beheading knife 45 is preferably provided with inclined projections 52 and 53 (see Figs. 13, 14, and 22). Such projections are preferably provided on each side of the knife and serve to shove the head, upon its being severed, away from the knife and the projection on the opposite side tends to shove the body away from the knife, thus operating to force the head and body in opposite directions. While such projections are preferably provided on both sides of the knife as shown in Figs. 14 and 22, such projection, as 53, may be provided only on one side. This would preferably be on the side engaging the head.

Fixed fish engaging parallel guide 54 is mounted on the table longitudinally of the table in order to maintain the fish in aligned position while being carried beneath the knife 45. This guide (or holder) 54 has an upstanding rib-like member like the rib 41 of puller 35, Fig. 21, and said guide also serves to hold the fish from being pulled back beneath the knife after the head is severed and the conveyor chains are stopped by a clutch mechanism (described hereinafter) with the fish at the beheading station. An upstanding inclined fish guide 55 is mounted rearwardly of the knife slot 49 to shove the body of the fish toward groove 30 and away from the plane of rotation of the knife so that the knife on its upstroke through opening 50 does not contact the body of the fish. Rods 85, 86, and 87 (like rods 42 and 43) lessen the friction of the body of the fish while moving rearward after the head is severed. These rods are all very important in keeping the fish in transverse position and assist the pullers 38, 39 and 40 and upstanding inclined guide 55 in moving the fish transverse of the table, i. e., away from the upstroke of the knife 45.

At the front end of the table an adjustable fish nose guide member 60, Fig. 23, may be mounted, and which nose guide may have a hand rest member 61 so that the operator may have his fingers extending out from the guide in a position to receive the back side of the head of the fish while the right hand moves the fish onto the table from an adjacent shelf 62 in timed relation to have the fish engaged by lugs 34 on the conveyor chains in substantial transverse alignment. The fish are fed to shelf 62 from a chute 63.

Figure 4:
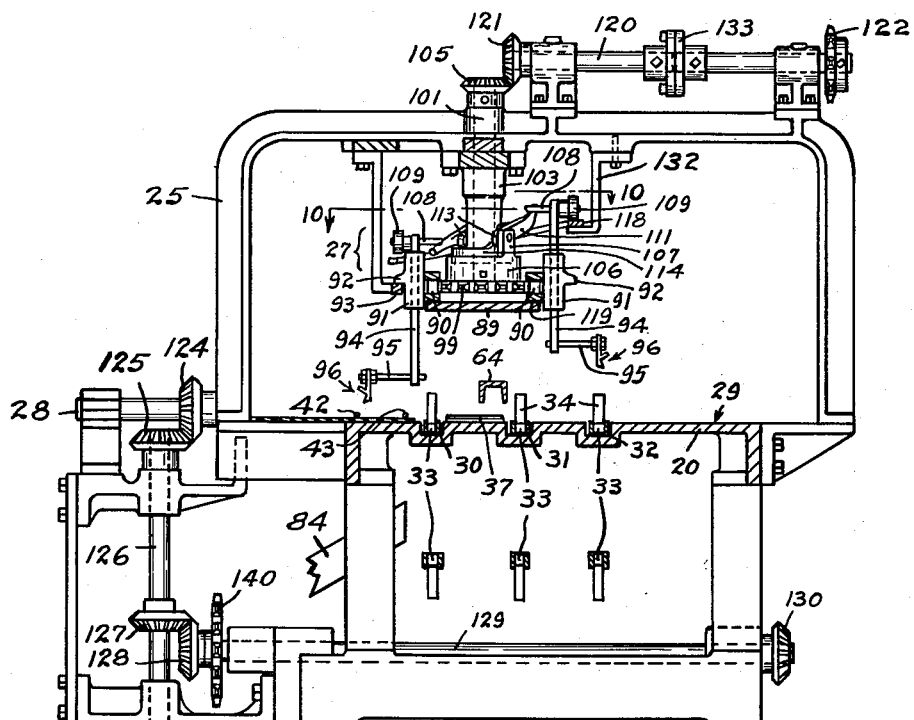
Fig. 4 is a view in cross section substantially on dotted line 4—4 of Fig. 2.

Vertically slidably mounted and therefore floatingly mounted above the table is combined puller and hold-down means 64 and 65 (see Figs. 3, 16, 17, 18, and 19). These means are alike. Each comprises a member 66 and a member 67 hinged or pivoted together at 79. Blocks 183 have slots 184 held by bolts 185 adjustably limiting the degree of swing of member 67 with respect to member 66 by bearing against block 66' secured to said member 66. On members 66 are two upstanding ears 68 and 69 to which mounting rods 80 and 81 are pivotally secured. These mounting rods extend through sleeves 70, Fig. 19, mounted on plate 89, Fig. 4, and have nut 71 and locking nut 71a thereon. Rod 81 is mounted like rod 80 relative to plate 89. This permits fish of different size to pass beneath said combined puller and hold-down means 64 since the fish will raise the thus floatingly mounted means while passing thereunder. This means 64, i. e., members 66 and 67, is preferably of channel construction having flanges 72 and 73, see Fig. 19. A diagonally disposed fish puller member 74 is secured to the underside of the leading member 66. This operates to pull the fish away from groove 30. This action is greatly increased by having means 74 disposed above diagonally fixed pullers 35 and 36 (Fig. 3) so that the two, i. e., the upper means 74 and the lower means 35 and 36, can cooperate in a particularly efficient manner to develop pulling forces. As the fish advances and is shoved nearly into alignment, it passes beyond means 74 and the pulling force is only that of bottom puller 37. Member 67 operates to hold the fish in position and against puller 37. Puller 37 is preferably shorter than pullers 35 and 36 so that the pulling force ends just before the cleithrum of the fish reaches the line of alignment 75 which is next explained below.

The beheading knife establishes what is herein referred to as the line or plane of cutting and this line or plane of cutting is identified in the table by the broken line 75, Fig. 2, that is, said line being the line of intersection of said plane with the plane of the table. It is with respect to this line 75, referred to herein as "line of alignment," that all the aligning means herein provided operate to bring the cleithrum 46 of a fish in coincidence or direct registry at the time that the knife 45 contacts the fish in the beheading operation. The flange members 76 and 77 of the hinged member 67 are provided with relatively sharp tooth-like projections 78, Fig. 16, for the purpose of more securely holding the fish. In controlling the fish, this tooth-like construction on the hold-down means has been formed to be exceptionally efficient.

In the modified form of floatingly mounted hingedly connected two-member hold-down means Fig. 16a has member 72 also provided with tooth depending fish engaging faces 78' without any puller means 74. This is a particularly efficient hold-down means. Its hold on each fish is sure even when a small fish follows or precedes a large fish as it hinged character facilitates its adapting itself to the fish passing beneath.

The overhead aligning means, Figs. 1, 2, 4 and 11, referred to in general as 27, consists of an endless indexer chain 90 to which is secured square guide sleeves 91 having projections 92 to ride on outer bar 93 which supports the sleeve 91 while the clip 96, slidably mounted in said sleeve, engages a fish. In these guide sleeves 92 are mounted square rods 94—being square, they are prevented from turning. These rods carry arms 95 on the ends of which are mounted fish engaging clips 96. Since rods and clips are threadedly mounted they may be readily adjusted. These clips 96 (see Figs. 5, 6, 7, and 8) preferably have a bottom portion divided into two parts, about one-half has a rounded portion 97 (Figs. 5 and 7) to permit this part of the clip to pass relatively easily over the rear firm dorsal portion of the fish. The other part 98 of the clip is a sharp edged portion (see Figs. 5 and 8) whereby the clip is aided in engaging the cleithrum bone of the fish by getting down behind said bone for a firm grip on the fish. This bone is located (see Fig. 9) near the bones 47 forming the rear part of the gill opening. The fish-contacting face of the clip, that is, the underside is of a concave form (see Fig. 6), the better to approximate the curvature of the fish transversely considered. Also, clip 96 preferably has the gill catching flange 207. In the case of one fish out of hundreds, it may happen that the gill cover will be open and by holding the gill cover down by flange 207, the operation of the clip with respect to the cleithrum is facilitated. The chain 90 is mounted on index sprocket wheels 99 and 100 and which sprocket wheels in turn are mounted on shafts 101 and 102. Index sprocket wheel 99 is fixed to shaft 101 by a tapered pin 131 (Fig. 11) which pin drives sprocket 99. Shafts 101 and 102 are mounted in sleeves 103 and 104, Figs. 2 and 11, both of which are secured to the frame members 25 and 26, respectively. Shaft 101 has driving bevel gear 105. Upon sprocket wheel 99 is mounted arm lift mounting member 106 (see Fig. 24). This lift member 106 has two upstanding ears 107. Shaft 108 is carried at the upper end of rod 94. On shaft 108 is mounted roller 109 with spacer stop member 110—a stop member because it engages top of sleeve 91. In ears 107 are pivotally mounted arm lifts 111 on pins 112, Figs. 10 and 11. Arm lifts 111 have rollers 113 intermediate their length. Cam member 114 is fixedly adjustably secured to sleeve 103 by set screws 115, Fig. 10. Said cam 114 has cam face shown in outline (Fig. 12), said face having abrupt lift shoulder face 116 and gradual let down face 117. As sprocket wheel 99, carrying arm lifts 111, revolves, it is timed with cam 114 to cause arm lifts 111 to suddenly move upwardly as roller 113 engages face 116 of the cam 114 and engages shaft 108 at the very moment that clip 96 in engagement with the cleithrum 46 of a fish has moved the fish transversely of the table and has caused the cleithrum to coincide or register with the plane of cutting, i. e., line 75. Thus, arm lifts 111 instantly rise because of sudden movement due to abruptness of face 116 and disengage clips 96 from contact with a fish, so that the fish is no longer moved transversely of the table. It is then maintained directly on its forward course by fixed guide 54. Cam means 114 lifts the clip 96 sufficiently above the fish to disengage clip 96 from the largest fish, i. e., the fish having greatest depth or vertical distance above the table. Thereafter as arm 111 is revolved its roller 113 reaches part 117 of cam 114 and is lowered so that it will pass under the next oncoming shaft 108, and thus be in a position to be lifted upwardly to strike shaft 108 and disengage its clip 96 from the next advancing fish. Roller 109 engages the inclined end portion of track 118 (see Fig. 1) which lifts the clip 96 the necessary further distance above the table to enable such clip to clear the fish advancing thereunder as said clip 96 is returned to the forward end of the table where the track 118 slopes downwardly to allow the rod 94 and its clip 96 to descend into fish engaging position. Track 118 (Fig. 1) is supported by brackets 132 carried by U-shaped brackets 25 and 26.

It will be noted that the index or aligning chain 90 (Fig. 2) is disposed at an angle to the longitudinal axis of the table so that the clips 96 have two components of motion, one forwardly and one transversely of the table. The forward movement is at a rate equal to that of the advancing fish and the rate of travel transversely is such as to bring the clip 96, while it engages the fish beneath the cleithrum, into alignment with the plane of cutting line 49. The travel of clip 96, after contacting the fish, is in sliding and skin depressing contact with a fish and this continues until the clip 96 engages the cleithrum 46 whereupon it shoves the fish snoutward in a direction transversely of the table until said cleithrum 46 is in alignment or registration with alignment line 49. A plate 89, Fig. 11, serves as a track supporting means for the bearing 119 of sleeve 91. As sleeve 91 is mounted on the chain 90, said plate 89 serves as a track supporting means for the chain 90 throughout its length. On U-shape bracket 25, Fig. 4, there is mounted shaft 120 having mounted on one end portion bevel gear 121, engaging bevel gear 105, and on the other end portion a sprocket wheel 122 with adjusting coupling 133 to permit adjusting the position of clips 96 lengthwise of the table with respect to lugs or fish pushers 34 on conveyor chains 33.

A knife shield or guard 123, Figs. 1 and 21, is preferably mounted over the knife 45 as a guard against accidents. Shaft 28, Fig. 4, on which the knife mounting member 44 is splinedly secured, has bevel gear 124, meshing with bevel gear 125 on vertically disposed shaft 126 which shaft has at its lower end portion bevel gear 127 which in turn meshes with bevel gear 128 carried on the end of shaft 129 extending transversely of the table. On the other end of shaft 129 is bevel gear 130 which may be connected by a commonly employed train of gears or other power transmitting means to a suitable source of power. On transversely disposed shaft 129 is mounted a sprocket wheel 140 over which passes chain 141, Fig. 1, which also passes over sprocket wheel 142 which is mounted on shaft 21. Shaft 21 is fixedly mounted in the frame 20 of the table and also in U-shape bracket 144, Fig. 2, carried by the frame of the table.

Sprocket wheel 142, Fig. 20, is mounted in an assembly of parts as follows: A clutch member 145, Fig. 20, is idly mounted on shaft 21, said clutch member having a clutch jaw face 146 and a shoulder 147 on which sprocket wheel 142 is fixedly mounted by means of set screws 148 holding a retaining collar against such sprocket and shear pin 149. A bearing washer 150 is mounted against the end of the clutch member 145 to receive the thrust of spring 151 which spring on its opposite end bears against mounting bracket member 144. A collar 152 is fixedly mounted on shaft 21 and is disposed in a recess 153 in clutch member 145. The thrust of spring 151, functioning as a safety device against too great strains, holds clutch member 145 against said collar 152, said collar definitely limiting the movement of the clutch member 145 longitudinally of the shaft 21 toward clutch member 154. Movable clutch member 154 having face 155 is mounted on shaft member 21 longitudinally movable of spline or key 156. Collar 157 is disposed in recess 158 of clutch member 154. Collar 157 definitely limits the movement longitudinally of the shaft 21 of clutch member 154. Collar 157 definitely limits A separable section yoke collar 143 (Fig. 2) is mounted in recess 159 of clutch member 154. To this yoke collar 143 is secured a lever or clutch handle 160, Figs. 2 and 20, by pin means 161. Lever 160, Fig. 2, is pivotally mounted at 162 on bracket 144 for horizontal swinging and slight tilting vertically. Fixedly secured underneath bracket 144 is a block member 163 shown in dotted lines in Figs. 2 and 3, under which member 163 the lever or clutch handle 160 is disposed. On the upper side of such handle is fixedly mounted an abutment block 169 which may abut block 163 when the clutch members 145 and 154 are engaged. Slight lowering of the grip end of handle 160 will disengage these blocks. Tension spring 164 is attached by one end to lever 160 and by its other end to bracket 144, and the tension is slightly upwardly directed so that the lever or clutch handle 160 is held upwardly against the underside of bracket 144 with its block 169 tight against block 163 when the clutch members 145 and 154 are engaged. In this way clutch member 154 is held in engagement with clutch member 145 so that rotary motion is imparted to shaft 21 through spline or key 156. Conveyor chain sprocket wheels 24, Fig. 2, are splinedly or otherwise fixedly mounted on shaft 21. Thus, the conveyor chains are driven through clutch 145—154 when its elements are engaged.

To release the clutch it is only necessary for the operator to give a blow downwardly on handle 160, which serves to push block 169 below block 163 to disengage the former from the latter so that spring 164 is free to swing the handle horizontally about its pivot and urge the clutch member 154 away from clutch member 145 without directive effort of the operator who needs both of his hands for other matters during such emergency.

At times it becomes necessary to stop the conveying or advancing of the fish and it is desirable at such times that the conveyor chains 33 with their lugs 34 do not stop with the fish halfway beneath the knife 45, Fig. 1. It is desirable to have the conveyor chains 33 stop with a fish directly beneath the knife and as said knife receives its power directly from shaft 129 it continues to revolve and severs the head of a fish which is conveyed to the position beneath its revolving blade 45. In order to have the conveyor chain mechanism stop the fish with the lugs delivering a fish directly beneath the beheading knife for complete severance, the clutch mechanism 145 and 154, above described, are provided in conjunction with the clutch member next to be described. Idly mounted on shaft 21 is a clutch member 165 mounted upon the frame member 20 of the table by bolts 166. Clutch member 165 has clutch face having a recess 167.

Clutch member 154 has a clutch face having a projection 168. The spacing between clutch face 155 and clutch face 146 is such that clutch face 155 of clutch member 154 cannot become disengaged from clutch face 146 until projection 168 slides into recess 167 thereby disconnecting the transmission of power to the shaft 21. Since clutch faces 146 and 155 cannot be disengaged until projection 168 revolves until it engages 167 when it is forced longitudinally of the shaft 21 by lever 160 and spring 164, the conveyor chains 33 cannot stop with a fish partly under or through the knife. The timing of the stopping of the conveyor means, i. e., chains 33, by recess 167 and the projection 168 is such as to preclude any stopping of the conveyor means with the lugs 34 of said conveyor chains presenting a fish at any other position than directly beneath the knife as respects those lugs 34 adjacent the knife.

On the end of shaft 21 is mounted a sprocket wheel 180 over which extends sprocket chain 181, Fig. 2. This chain in turn extends over sprocket 122, whereby the aligning or indexing means 27 is operated.

A V-shaped trough 182 at the end of the table receives the fish from the table after they are beheaded, being moved to such table end by conveyor chains 33. From such trough an operator removes the fish, the trough of such shape holding the fish in proper belly-up position as shown in Fig. 3.

In the modified form of the clutch mechanism shown in Fig. 27, the collar 157 is omitted and a spiral spring 185' disposed in recess 158 is substituted, having one end bearing against member 154 and the other end of said spring bearing against collar 152. This spring replaces and makes unnecessary spring 164 (Fig. 2). Enclosing the spring member 185' within the mechanism renders it more directly positive in action and less subject to contamination by pieces of fish and slime and less in the way of the operator.

In the modified forms of the puller and holddown means, Figs. 28 and 29, the front member 186 has two side plates 187 and 188 through which hinge bolt 189 passes to mount rear member 190. Both members 186 and 190 are of channel form cross-sectionally considered as in forms Fig. 16 and Fig. 19 and are mounted vertically floatingly upon rods 196 and 197 corresponding substantially to rods 80 and 81 of Fig. 16 and having substantially the same mounting means so that the rods may rise and fall and let fish of varying size pass thereunder. Side plate 187 has an enlarged end 191 to receive adjusting bolt 192 having lock nut 194. In this modified form the underside of front member 186 and rear member 190 preferably have a plurality of inclined ribshaped pullers 195 in contrast to having a single puller on the front member. Also instead of the rear member having teeth, as in form shown in Fig. 16, it has a puller member 195. Members 186 and 190 are preferably wider than 66 and 67 in order to augment the pulling action. Also, the plurality of pullers 195 increases or augments the pulling effect. The adjusting bolt 192 makes it possible to readily adjust member 186 to be disposed at an angle or elevated at its front end so that it can more readily receive a large fish. Pullers 195 are preferably employed in cooperation with bottom pullers 35, 36 and 37 (Fig. 3) and the pullers 195 are disposed in parallel relation to upstanding edges 41 of said bottom pullers. Such construction and combination insures very positive and efficient application of pulling forces upon the fish in drawing it to the alignment bar and causing the engagement of the cleithrum therewith, as set forth hereinbelow with respect to Figs. 30 to 36.

In Figs. 30, 31, and 32, further modifications of our invention are illustrated. These relate to the aligning of the fish on a table having conveying chains, rotating knife and clutch substantially in all respects the same as hereinabove set forth with the following particular difference: Instead of aligning by moving power driven clips 96, a plurality of cleithrum engaging relatively short members 198, 199, 200 and 201 are vertically floatingly mounted in the vertical plane of the line 75 of cutting of the rotating knife 45. Members 198 to 201 are pivotally mounted on rods 202 slidingly mounted in sleeves 203 carried by plate 204. Plate 204 is mounted above the table 20 on Ushape brackets 205. Members 198 to 201 preferably have the relatively sharp edge 206, Fig. 32, extending entirely across the face of each of said members. Also, said members may have the gill catching member 207. These alignment members 198 to 201 may be connected by links 208. Rods 202 have nuts 209 and 210, the latter serving as a lock nut. As many nuts 209 may be added as may be desired to supply the desired degree of pressure of members 198—201 upon the fish. Thus, edge 206 of these members 198 to 201 lies in a relatively straight line so far as a plan view is concerned but capable of being pressed by the varying sized fish into a flexible or sinuous line horizontally considered, as seen in Fig. 31. Accordingly, such members 198 to 201 constitute a stop to any movement of the fish transversely of the table after they become engaged with the cleithrum of the fish, and they guide the fish to the knife with the cleithrum in registration with the line of cutting of the knife to avoid wastage of edible meat. Fixed bottom pullers 35, 36 and 37 are provided to pull the fish to the right of the table, i. e., away from the line of cutting of the knife as in the first described form.

In this modified form, such pullers pull the fish in a direction to the right of the table beneath members 198 to 201 until the cleithrum 46 becomes caught against edge 206 and hold the cleithrum 46 against the edge. To insure such positive and prompt pulling to the right of the fish, the modified puller and hold-down members, as shown in Figs. 28 and 29, are preferably provided floatingly mounted above fixed bottom pullers 35 with pullers 195 registering with or disposed parallel to the edges 41, Fig. 21, of pullers 35, 36, 37 so that said pullers may fully cooperate in pulling the fish beneath alignment members 198 to 201 while said weighted members are pressed downwardly in skin depressing contact with the fish until its cleithrum 46 is brought into engagement with the edge 206 of such alignment members. Thereafter the fish is advanced by lugs 34 of chains 33 longitudinally of the table to the beheading knife 45. As the fish is engaged by parallel guide 54 and is about to pass beneath the knife 45, the fish is free and beyond the "pulling to the right action" of members 35, 36 and 37 and the upper pulling means 195 of 186 and 190. Thus, the fish proceeds beneath the knife with the cleithrum 46 in the alignment line 75, i. e., line of cutting of the knife.

The table 20 has extension plate 209' and antifriction rods 211 and 211' with nose guide 212' preferably similar in construction to guide 60, Fig. 23, so that the fish may be positioned initially by the operator with the nose against said nose guide 212' which in this modified form is positioned sufficiently to the left as viewed by one standing adjacent "shelf 62" and looking longitudinally of the table towards the knife of the line of cutting 75 to insure the cleithrum of the fish being initially to the left of the alignment members 198 to 201. Accordingly, such initial positioning of the fish insures the fish being pulled with its cleithrum against edge 206 of the aligning members 198 to 201.

In the modified form of our invention shown in Figs. 33, 34, and 35, instead of members 198 to 201 with links 208, we provide hinged members 212, 213, 214 and 215 pivotally connected by bolts 216, so that any gaps between the members is reduced and yet the desired degree of flexibility is provided to allow for and adapt the members to the varying sizes of fish passing therebeneath. These relatively short members 212 to 215 are mounted on rods 217 corresponding to rods 202 and having similar sleeve mountings as provided for rods 202 so that the same are floatingly mounted for varying sized fish. The members 212 to 215 preferably are of the cross section shown in Fig. 35 where the bottom face is concave but lacks the sharpness of the edge 98, Fig. 5, so that the pulling effect of bottom pullers 35, 36 and 37 and upper pullers 195 do not have too great a resistance to their pulling action previous to the engagement of the alignment members 212 to 215 with the cleithrum, i. e., while the fish is being transversely moved into engagement with said alignment members. The hinge parts 218, 219 of member 212 and the central hinge part 220 of member 213 provide for a part of each member 212 and 213 to be in engagement with the fish.

In the modified form shown in Fig. 36, a single alignment member 225 is provided of a length to extend substantially between two sets of lugs 34 of the conveyor chains 33. This single alignment guide is substituted to perform the function of the alignment members 198 to 201 and the other alignment members of the modified forms shown in Figs. 33 to 35.

In Fig. 37 a modified form of the portion of a cam of our invention shown in Figs. 10, 11, and 12 is shown. In this modified form an upper member 226 with slot 227 which permits adjustment thereof is positioned above cam member 114 by securing the same by bolt 228 to member 103 thus providing an upper guide face 229. By this construction the roller 113 is confined in its travel over a portion of the cam and prevents all possible dislodgement of arm 111 thus insuring that arm 111 will aways be in operative position beneath shaft 108 when the latter reaches the pertinent section of its path of travel.

Mode of operation

The mode of operation of our invention has been set forth in large measure above in connection with the detailed description of the mechanism embodying our invention. The following however will supplement and serve to make more clear the understanding of the details of our invention:

Let it be noted that our invention in aligning varying sized fish, i. e., fish having varying sized heads, for the beheading operation to conserve all possible edible meat, employs in sequence, the nose, the body side, and the cleithrum. The method and mechanism of our invention provides for its optimum operation for the fish to all start from the same line established by the nose guide irrespective of size and provides for compensating for great variation in the length of the heads of the fish. This is accomplished by applying transversely directed forces to the body side of the fish for causing it to move to the side of the table opposite to that on which the beheading knife is located, and then employing the cleithrum as the part of the fish for final alignment. This, in conjunction with the nose guide, eliminates all application of judgment on the part of the operator in starting the fish and renders the operator's positioning of the fish merely mechanical. In supplying fish to the fish table he has only to place the nose of the fish against the nose guide by reason of the compensating means herein set forth.

The operator in feeding the fish ordinarily stands adjacent the front end of the table with his left hand palm resting on rest 61 of nose guide 60 with his fingers extending beyond to receive, arrest and temporarily grasp the head of a fish shoved by his right hand transversely of the table top 29. He takes his cue as to when to shove the fish forward by watching for the spacing of the lug 34 in groove 30. For purposes of reference the side of the table on which groove 30 appears is herein identified as the left hand or near side while the side on which groove 32 appears is herein identified as the right hand or far side. He may safely relay upon such lug in said groove 30 or left hand side because in our invention the fish is disposed at right angles to the line of advance and this is made largely possible by having the axis of the rotary knife shaft disposed at right angles to the longitudinal axis of the table. When the fish beheading knife shaft is disposed at an angle to the said axis of the table, then lugs 34 in the far groove 32 are substantially in advance of the lugs 34 in groove 30. As the operator may more easily take his cue from the nearest groove in synchronizing his feed of the fish to the table, he may feed a fish too late to have the lug 34 in groove 32 come up behind the tail end portion, then that fish must be removed and that compartment proceeds forwardly without a fish, all of which involves less production, if not a mangled and lost fish.

The operator places the fish with its nose against the upstanding edge of the nose guide 60 which is adjusted to have the cleithrum 46 of the fish well towards the groove 30 in the preferred form of our invention, preferably to the right of the alignment line 75 as shown in Fig. 3. From then on the machine automatically does the rest. The lugs 34 move the fish forward against the pullers 35, etc., and beneath floatingly mounted combined pullers 74 of hold-down means 64. These functions to pull the fish tailward farther toward the right away from alignment line 75 and toward groove 32. While the fish is thus moving to the right, the supporting roller 109 for clip 96 carried in elevated position rolls off trackway 118, which permits clip 96 to descend and floatingly but skin depressingly contact the fish, and while such clip is moving to the left toward line 75 it also is moving simultaneously forwardly at the same rate that the fish is being advanced by lugs 34. Lugs 34 somewhat indent the relatively soft belly part of the fish as they overcome the combined retarding forces of pulleys 35, etc., and puller 74 as well as hold-down means 67. The "Pulling away" forces of the said pullers below and above are of a magnitude to cause the fish to continue moving to the right even after clip 96 contacts the fish. But when the clip 96 engages the cleithrum 46 then the fish is moved to the left toward the alignment line 75. This pulling action thus makes it possible to have all the fish, large and small, start with their noses from a common line, i. e., the nose guide 60, so that the operator has no judging to do in starting the fish on the table. He has only to position the fish with its nose against the guide, and the machine automatically and mechanically then compensates for the variation in the distance between the nose and the cleithrum obtaining in small fish and large fish in the same species, as well as between different species.

The fish starting from the predetermined line established by the nose guide are sufficiently far to the left to insure that although the pullers will move each fish, small and large, successively tailward, i. e. to the right, the large fish will be sufficiently advanced lengthwise of the table to have its cleithrum engaged by the clip 96. A smaller fish will start with its cleithrum further to the left than the large fish so the only difference will be that the clip 96 will not reach and engage the cleithrum 46 of the smaller fish quite as quickly as in the case of the large fish whose cleithrum, because of the extra length of the head, started out more to the right than that of the small fish. But the pulling action insures that the cleithrum of both the small and large fish will be engaged by the clip 96 as the pulling action will bring the small fish to the right sufficiently to have its cleithrum engaged by the clip 96, even though at a more advanced position on the table than in the case of the larger fish whose cleithrum started out further to the right so that the clip did not have so far to travel transversely of the table to engage its cleithrum. Thus compensation is automatic for the large and small fish. This is a very important feature and greatly facilitates the operation of the device of our invention.

Figures 5, 6, 7, 8:
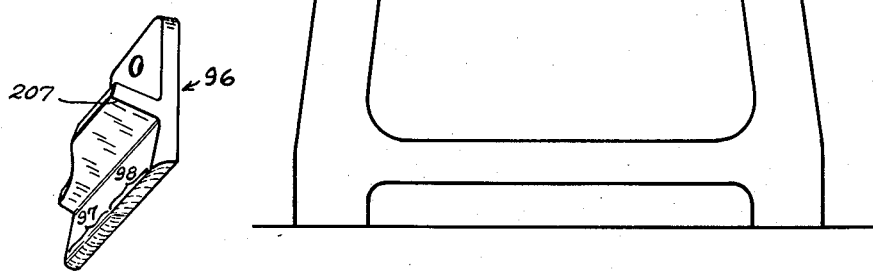
Fig. 5 is a view in perspective from one end of a fish engaging aligning clip of said device.
Fig. 6 is a front elevation of said clip.
Fig. 7 is a view in cross section on dotted line 7—7 of Fig. 6.
Fig. 8 is a view in cross section on dotted line 8—8 of Fig. 6.

The rounded half 97 of the clip 96, Figs. 5, 7, and 8, helps the clip 96 do the necessary sliding over the fish until the cleithrum 46 is reached and then the sharpened portion 98, having moved in skin depressing manner moves into gripping position behind the cleithrum—the rounded portion 97 functioning to so dispose the pressure of the clip contact to cause the sharpened portion 98 to definitely grip the cleithrum 46. The head supporting rods 42 and 43, Fig. 2, very materially assist in rendering the fish responsive to the several forces described above. The head represents a relatively heavy part and as lugs 34 must engage both large and small fish such rods reduce the friction of the head upon the table to an unobjectionable degree. As the clip 96 finally moves the fish until the cleithrum 46 is in registration with the line 75, then the lifting arm 111 is moved upwardly as roller 113 strikes the abrupt shoulder face 116 of the cam 114, Fig. 12, with such suddenness as to be practically bumped upwardly so that clip 96 is disengaged and thereby suddenly stops moving the fish and leaves it with its cleithrum precisely in registration with line 75. At this point it will be noted that the fish is beyond the pulling action of puller 37 and is guided forward by engagement with fixed parallel guide 54, Figs. 1 and 2, at the time the head severing occurs. As the knife 45 engages the fish, the knife itself serves as the support of the head and after the knife 45 has passed through, the head is free to drop into chute 84, rod 85 being inclined to leave the head unsupported and thus free to drop clear, and the head preferably being forced outwardly somewhat by projection 53, Fig. 13, on knife 45. As there are no hold-down means opposite the knife, the beheaded body of the fish is free to move backward by the blow imparted by projection 52 upon severance of the head. Sharp shearing action of plate 48 assists the knife in its cutting operation. This plate 48, preferably of steel and relatively thin compared to the cast metal of the table top, can be readily filed to present a close fitting slot 49 to conform to the knife and thus augment the shearing action. As point 82 is the first part of the knife to engage the fish it divides the cutting operation into two parts, forward and aft, so that as the cutting proceeds simultaneously forward and aft, there is no objectionable dislodgment of the fish by the blow of the knife. Such "jump up" as may occur with the large fish only aids the blow from the projection 52 in forcing the body away from the knife 45 and to the right so that such blow, and the pulling to the right action of fixed pullers 38, 39, and 40, and the forcing to the right by upstanding inclined fish guide 55, all together definitely remove the beheaded fish to the right so that the knife 45 upon its upstroke is entirely free from all possibility of interfering with the tailward movement of the fish even though the plane of rotation of the knife 45 is parallel to that of the longitudinal axis of the table and general direction of advance of the fish.

The operation of the clutch requiring as it does that projection 168 revolve to recess 167 in order for it to be moved to a position which disconnects the driving force of sprocket 142 from the shaft 21 on which conveyor chain sprockets 24 are mounted, positively insures that the lugs 34 on said conveyor chains will only stop in proper predetermined position with a fish squarely beneath the knife 45. Such arrangement also insures the same timing and relationship of the lugs 34 and the knife 35 upon the resumption by operation of the clutch of the forward movement of the lugs as existed prior to stopping. As such operation of the clutch does not stop the rotation of the knife 45, the fish moved to a position beneath the knife is sure to have its head completely severed, and the conveyor chains with lugs 34 will be ready to move forward as previously to the stopping of the conveyor chains by throwing out the clutch.

Such operation of the clutch to so initiate the stopping of the conveyor chains 33 may be almost instantaneous as it requires only a downwardly directed blow, which operates to unlock or dislodge block 169 on the under face of clutch lever handle 160, Fig. 2, from bearing against block 163 fixedly secured to table bracket 144, whereupon disengagement will be effected by spring 164 (Fig. 3) or 185' (Fig. 27). Thereupon, the fish only advance during the time that projection 168, Fig. 20, revolves to come into registration with recess 167 which it enters automatically by reason of spring 164. By so having the conveyor chains 33 stop as described, there is no mangled or chewed up fish to remove and discard as heretofore, when the fish have been advanced to and stopped beneath the knife when only part way entered thereunder. Obviously, when the shape of the knife 45 is considered, if the fish is not in its predetermined and proper position, then the knife may cut with its forward edge into the fish and this would cut through choice edible meat rearward of the proper line of cutting, with consequent wastage of meat. In short, since the knife 45 is of a definite shape conforming to and determined by, the shape of the fish head, it is clear that the fish must be in the proper position or the function of the shape of the knife will be of no account but will operate to waste fish as it is adapted and shaped to cut properly only when the fish is in the proper position. The clutch of our invention insures this and is an important feature of our invention. Such removal of the mangled fish has been heretofore accompanied with danger from the revolving knife, as well as wastage of the fish and often loss of time beyond that causing the shut down. Our invention eliminates this danger and the cause for having a mangled fish.

Thus it will be seen how all the features of our invention combine in their operation to provide for protection to the operators, elimination of wastage by precise "caliper-like" alignment of the fish, and prevention of wastage by elimination of mangled fish and lost motion due to errors in feeding the fish and permits continued operation at high speed for extended periods or runs.

Let it be noted that while we prefer a beheading knife of the rotary character nevertheless, the chopper type which reciprocates to and from the table and is well known in the art, may be used.

The mode of operation of the modified forms shown in Figs. 30, 31, and 32, it will be seen, do not have a moving or traveling power driven clip member, as 96, to move the fish into alignment but do have means fixedly mounted on the table as the fixed pullers 35, 36 and 37 which operate to pull the fish to the right or toward groove 32. Preferably also there is provided the cooperating upper pullers 195 floatingly mounted by means of rods 196 and 197 above and in parallel relation to fixed pullers 35, 36, and 37. These two puller means operating simultaneously upon opposite sides of the fish exert a positive pulling action on the fish as it is advanced longitudinally of the table and operate to pull the fish tailward toward the right, that is, toward groove 32. The fish is initially placed by the operator with its nose against guide 60 and this is adjusted in this modified form, see Fig. 30, so that the cleithrum 46 of the various sized fish is very definitely to the left of the alignment line 75. The alignment means composed of floatingly mounted members 198 to 201, Fig. 31, with edge 206 in registration with alignment line 75 (line of cutting) operate to engage the cleithrum 46 and thereupon hold or stop the fish from being pulled further to the right by the lower pullers 35, 36 and 37 and upper pullers 195. The fish is so held against such pulling action until it is advanced and engages parallel guide means 54 and then the fish is advanced only longitudinally of the table, and not tailward or headward, until it passes beneath rotary knife 45. It will be understood that either the fixed pullers 35, 36 and 37 on the table may be employed as the sole pulling means or the upper pullers 195 may be employed exclusively as such pulling means. Preferably and, as shown herein, the two, the lower and the upper pullers are used in combination to provide the action pulling the fish to the right and to bring the cleithrum 46 into engagement with the edge 206 of the alignment means comprising floatingly mounted members 198 to 201. Upon reaching the beheading knife 45, the operation of the table thereafter is as hereinabove set forth.

The mode of operation of the alignment means of the modified form, Fig. 33, is the same in general as that comprising members 198—201. However, between members 198—201 there is a gap in the line formed by 206, while in the modified form shown in Figs. 33 and 34 the members are provided with a convex end fitting into the concave end portion of the link preceding so that no gap results and therefore there is no question of the end portion of the members catching or piercing the skin of the fish rather than riding thereover.

In Fig. 36, a single member 225 floatingly mounted is employed as the alignment means and being a single member of a length extending between lugs 34 of the conveyor chains 23 it eliminates all problem of "gaps."

The mode of operation of the modified form of the cam 114 of our invention illustrated in Fig. 37 is set forth in connection with its description hereinabove.

Obviously, changes except as herein set forth may be made in the forms, dimensions, and arrangement of the parts of our invention, without departing from the principle thereof, the above setting forth only preferred forms of embodiment.

We claim:

1. In a fish aligning beheading feed table for processing fish, a feed table having fish conveyor chains travelling lengthwise thereof from a fish feeder to a fish discharge end; pusher means secured to said conveyor chains in uniform spaced relation, whereby a fish may be conveyed over said table by sliding the fish on its side while contacting the table; a fish beheading knife operatively mounted at one side of the table adjacent the discharge end; fish puller plate fixedly mounted on said table surface having an upstanding rib disposed at an angle diverging in the direction of the fish travel and away from the knife side of the table; and a driven aligning fish cleithrum engaging clip movable in a rectilinear path inclined towards the knife side of the table while engaging the cleithrum of a fish simultaneously while said fish is being urged by said puller plate in the opposite direction.

2. In a fish aligning and beheading feed table for processing fish, a feed table having fish conveyor chains travelling lengthwise thereof from a fish feeder to a fish discharge end; pusher means secured to said conveyor chains in uniform spaced relation, whereby a fish may be conveyed back-first over said table by sliding the fish on its side while contacting the table; a fish beheading knife operatively mounted at one side of the table adjacent the discharge end; fish puller plate fixedly mounted on said table surface having an upstanding rib disposed at an angle diverging in the direction of the fish travel and away from the knife side of the table; a driven aligning fish cleithrum engaging clip movable in a rectilinear path inclined towards the knife side of the table while engaging the cleithrum of a fish simultaneously while said fish is being urged by said puller plate in the opposite direction; a track on which said clip may be moved for a portion of its path in elevated position as respects the fish passing thereunder, said clip being dropped upon the fish at the end of said trackway and moved rectilinearly for a portion of its path in skin depressing contact with a fish until said clip engages the cleithrum of the fish and then said clip with said engaged cleithrum moves said fish into registration with the beheading knife against the force of said pulling plate; and a top frame mounted on said table above the conveyor chains to which frame said track is secured.

3. In a fish aligning and beheading feed table for processing fish, a feed table having fish conveyor chains travelling lengthwise thereof from a fish feeder to a fish discharge end; pusher means secured to said conveyor chains in uniform spaced relation, whereby a fish may be conveyed back-first over said table by sliding the fish on its side while contacting the table; a fish beheading knife operatively mounted at one side of the table adjacent the discharge end; fish puller plate fixedly mounted on said table surface having an upstanding rib disposed at an angle diverging in the direction of the fish travel and away from the knife side of the table; a driven aligning fish cleithrum engaging clip movable in a rectilinear path inclined towards the knife side of the table while engaging the cleithrum of a fish simultaneously while said fish is being urged by said puller plate in the opposite direction; a track on which said clip may be moved for a portion of its path in elevated position as respects the fish passing thereunder, said clip being dropped upon the fish at the end of said trackway and moved rectilinearly for a portion of its path in skin depressing contact with a fish until said clip engages the cleithrum of the fish and then said clip with said engaged cleithrum moves said fish into registration with the beheading knife against the force of said pulling plate; a top frame mounted on said table above the conveyor chains to which frame said track is secured; and hold down means floatingly supported by said top frame, said means having a depending fish pulling rib on its underside floatingly disposed above and similarly diverging as said first pulling means, whereby fish being advanced over said table are engaged as respects both body walls and are urged away from the knife side of the table.

4. In a fish aligning and beheading feed table for processing fish, a feed table having fish conveyor chains travelling lengthwise thereof from a fish feeder to a fish discharge end; pusher means secured to said conveyor chains in uniform spaced relation, whereby a fish may be conveyed back-first over said table by sliding the fish on its side while contacting the table; a fish beheading knife operatively mounted at one side of the table adjacent the discharge end; fish puller plate fixedly mounted on said table surface having an upstanding rib disposed at an angle diverging in the direction of the fish travel and away from the knife side of the table, whereby the side wall of the body of the fish may be slidingly engaged and the fish moved transversely of the table; and an actuated aligning fish cleithrum engaging clip movable in a rectilinear path inclined towards the knife side of the table while engaging the cleithrum of a fish simultaneously while said fish is being engaged by said puller plate.

5. In a fish aligning and beheading feed table, a feed table having fish conveyor chains travelling lengthwise thereof, pusher means secured to said conveyor chains in uniform spaced relation, whereby a fish may be conveyed back-first over said table by sliding the fish on its side while contacting the table; a frame member extending over the top of said table; and a fish hold down mechanism floatingly suspended from said frame member comprising a front member and a rear member hingedly connected to said front member, said front member having a fish pulling angularly disposed rib inclined divergingly from the longitudinal axis of the table and the rear member provided with a toothed edge plate on its underside to engage a fish.

6. In a fish processing table, a feed table having fish conveyor chains travelling lengthwise thereof; pusher means secured to said conveyor chains in uniform spaced relation, whereby a fish may be conveyed over said table by sliding the fish on its side while contacting the table; and a beheading knife having a blade with a wedge-shape block mounted on the head side in spaced relation to the cutting edge of the blade, whereby the head is forced away from the blade after the head is severed from the body.

7. In a fish processing table, the combination of a driven mounting means, a fish engaging clip carried by said mounting means having a fish contacting bottom face formed with a rounded surface for a portion of the length thereof, whereby is facilitated the sliding of said clip over a fish in skin depressing manner, and the balance of said bottom face formed with an edge to engage beneath the cleithrum of the fish.

8. A fish aligning and beheading feed table for processing fish comprising a fish feed table having fish conveyor chains travelling lengthwise thereof from a fish feeder to a fish discharge end; pusher means secured to said conveyor chains in uniform spaced relation, whereby fish may be conveyed back-first over said table by sliding the fish on its side while contacting the table; a fish beheading knife operatively mounted at one side of the table adjacent the discharge end, said knife intersecting the plane of the table on its downward stroke and the blade of said knife having a line of cutting; a fish puller plate fixedly mounted on said table surface having an upstanding rib disposed at an angle diverging in the direction of the fish travel and away from the knife side of the table; an aligning fish cleithrum engaging clip movable in a rectilinear path inclined towards the knife side of the table; a track on which said clip may be moved for a portion of its path in elevated position as respects the fish passing thereunder, said trackway terminating at the feed end of the table at a predetermined point of the advance of the fish towards the discharge end, said clip being dropped from said end of said trackway and moved rectilinearly for a portion of its path in skin depressing contact with a fish until said clip engages the cleithrum of the fish, whereupon said clip in its continued movement rectilinearly moves said fish while engaged with the cleithrum into registration with the line of cutting of the beheading knife against the force of said puller plate; and elevating means for said clip located at the end of its rectilinear travel, whereby said clip may be elevated and thereby disengaged from the cleithrum of the fish permitting the fish to advance lengthwise of the table while the cleithrum is in registration with the line of cutting of the beheader knife.

9. In a fish aligning and beheading feed table, a feed table having fish conveyor chains travelling lengthwise thereof, pusher means secured to said conveyor chains in uniform spaced relation, whereby a fish may be conveyed over said table by sliding the fish on its side while contacting the table; a frame member extending over the top of said table; and a fish shifting means floatingly suspended from said frame member having a fish pulling angularly disposed rib inclined divergingly from the longitudinal axis of the table in the direction of the advance of the fish.

10. In a fish aligning and beheading table, means to advance fish longitudinally of the table, a rotary knife mounting member, and a knife mounted on said mounting member and having a blade the cutting edge of which is formed with two points, one, a radially inner point, being circumferentially in advance of the other, a radially outer point, in the direction of knife rotation, said cutting edge having a concave portion between said mounting member and said radially inner point formed with a blunt double-beveled edge, and the radially outer end of said blade and the portion of said blade between said radially inner point and said radially outer point having a sharp cutting edge formed by a long bevel on only one side of the knife blade.

11. In a fish processing table, a fish table including a top having a plurality of parallel slots extending longitudinally of said table, a beheading knife adjacent to said table, conveyor chains extending along such slots and carrying lugs engageable with a fish to move it to said beheading knife lengthwise along said table while such fish is lying on its side crosswise of the table, rods fixedly mounted on the upper surface of said table top, extending longitudinally of said table and operable to be engaged by a fish to facilitate sliding of such fish transversely of the table while such fish is being moved longitudinally of said table toward said beheading knife by said lugs, and cleithrum engaging means operable to engage the cleithrum of the fish resting on said rods and move such fish transversely of the table.

12. In a fish processing table, a fish table including a top having a plurality of parallel slots extending longitudinally of said table, a beheading knife adjacent to said table, conveyor chains extending along such slots and carrying lugs engageable with a fish to move it to said beheading knife lengthwise along said table while such fish is lying on its side crosswise of the table, rods fixedly mounted on the upper surface of said table top, extending longitudinally of said table and operable to be engaged by the head of a fish to facilitate sliding of such fish transversely of the table while such fish is being moved longitudinally of said table toward said beheading knife by said lugs, and cleithrum engaging means operable to engage the cleithrum of the fish while its head is resting on said rods and move such fish transversely of the table.

13. In a fish aligning and beheading feed table, conveyor means for moving fish over said table comprising conveyor chains having fish moving lugs disposed in spaced relation, a drive shaft, sprocket wheels receiving said conveyor chains and secured on said drive shaft, and a clutch, whereby said lugs may be stopped at a predetermined position, including a driving member idly and longitudinally slidably mounted on said shaft and having clutch jaws on one side, stop means fixed on said shaft and limiting the longitudinal sliding of said driving member, resilient means urging said driving member against said stop means, a fixed clutch member mounted on the frame of said table having a recess in its clutch face, a movable clutch member splinedly, slidably mounted on said shaft and having clutch jaws on one side opposed to the clutch jaws of said driving member, and a projecting knob on its other side conforming to and registrable with the recess of said fixed clutch member, the space between the clutch jaws of said driving member in normal operating position and said fixed clutch member being less than the width of said movable clutch member, whereby the movable clutch member is not disengageable from the driving member until the projecting knob of the movable clutch member enters the recess of the fixed clutch member, and lever means for controllably moving the movable clutch member longitudinally of the shaft.

14. In the fish aligning and beheading feed table defined in claim 13, the lever means being pivotally mounted on the table and connected to the movable clutch member whereby the clutch jaws of the movable clutch member may be disengaged when its knob revolves to a point where it engages the recess of the fixed clutch member, thereby allowing said movable clutch member to slide lengthwise of said shaft sufficiently to disengage the clutch jaws of the driving member and movable clutch member at a predetermined point, effecting stoppage of the conveyor chains with their lugs in predetermined positions, a locking block mounted on the table, and a second locking block mounted on the lever means and selectively releasably engageable with said first locking block for controlling movement of the lever.

WILLIAM A. FONKEN.
EDMUND AUER.

REFERENCES CITED

The following references are of record in the file of this patent:

UNITED STATES PATENTS

| Number | Name | Date |
|---|---|---|
| 1,222,926 | Brierly et al. | Apr. 17, 1917 |
| 1,542,196 | Waugh | June 16, 1925 |
| 1,642,444 | Hovden | Sept. 13, 1927 |
| 1,643,504 | Lea | Sept. 27, 1927 |
| 2,208,645 | Savrda | July 23, 1940 |
| 2,346,935 | Oates | Apr. 18, 1944 |